Patented July 26, 1949

2,477,380

UNITED STATES PATENT OFFICE 2,477,380

PRODUCTION OF TERTIARY ALIPHATIC ALCOHOLS

Saul I. Kreps, New York, N. Y., and Frederick C. Nachod, Haddonfield, N. J., assignors to The Atlantic Refining Company, Philadelphia, Pa., a corporation of Pennsylvania No Drawing. Application August 30, 1946, Serial No. 694,162

8 Claims. (Cl. 260—641)

The present invention relates to the production of tertiary alcohols by the catalytic hydration of iso-olefins, and relates more particularly to the production of tertiary alcohols from iso-olefins containing from 4 to 12 carbon atoms per molecule by treatment with water in the presence of an organic hydrogen-ion exchange catalyst at elevated temperature and pressure.

We have found that substantial yields of tertiary alcohols may be obtained from iso-olefins of 4 to 12 carbon atoms by contacting the iso-olefin with water in the presence of an organic ion exchange material having exchangeable hydrogen ions at temperatures between 150° F. and 300° F. and under pressures sufficient to maintain the water in the liquid phase at the hydration temperature.

The hydration reaction may be carried out by contacting the iso-olefin, water, and catalyst in a heated pressure vessel provided with means for insuring vigorous agitation, the contents of the vessel being removed upon completion of the hydration, and the products being separated by filtration or decantation, and fractional distillation. Preferably, however, the hydration is carried out in a continuous manner by passing a mixture of iso-olefin and water, in the proper ratio and at the proper space velocity, through a bed of catalyst contained in a pressure vessel under suitable conditions of temperature and pressure effective to promote hydration of the iso-olefin. The products of the conversion, including the tertiary alcohol, may be separated from one another by fractionation, and unconverted iso-olefin and water may be recycled to the system for further conversion.

The iso-olefins which may be employed include isobutylene, isoamylene, isohexylene, isoheptylene, iso-octylene, iso-nonylene, iso-decylene, iso-undecylene, and iso-dodecylene, or mixtures of two or more thereof. The hydration temperatures may range from 150° F. to 300° F., and preferably fall between 190° F. to 250° F., with optimum conversions between 210° F. and 225° F. The pressure utilized in effecting hydration must be sufficient to maintain the water substantially in the liquid phase at the operating temperature, and may range from slightly superatmospheric pressure, i. e., of the order of 30 to 50 pounds per square inch up to 500 pounds per square inch, excellent conversions having been obtained at 200 to 400 pounds per square inch. The main purpose for employing elevated pressure is to maintain the water in the liquid phase in order that the organic hydrogen ion exchange catalyst may function as desired, since such catalyst does not appear effective when the water is in the vapor phase. The iso-olefin may or may not be in the liquid phase, and it is immaterial whether such hydrocarbon is maintained in liquid or vapor phase, or partly in each phase. The mole ratio of iso-olefin to water may range from 1 to 1 to 1 to 5, with good conversions in the range of 1 to 1 to 1 to 2. A ratio somewhat greater or smaller than given above may be utilized, if desired, but in most cases it is preferred to maintain at least molar equivalents of water to iso-olefin. In carrying out the hydration, the space velocity of iso-olefin to catalyst may range from 0.1 gram to 5.0 grams of iso-olefin per gram of catalyst per hour, with good results at space velocities of 0.5 to 1.5.

The organic hydrogen ion exchange catalysts useful in accordance with the present invention are relatively high molecular weight, water-insoluble resins or carbonaceous materials containing a functional group such as —$SO_3H$, —OH, or —COOH or a plurality of such groups. These catalysts are exemplified by the sulfonated coals produced by the treatment of bituminous coals with sulfuric acid, and commercially marketed as zeolitic water softeners or base exchangers. These materials are usually available in a neutralized form, and must be activated by treatment with mineral acid, such as hydrochloric acid, and water washed to remove hydrogen, sodium, and chloride ions prior to use in accordance with the present invention. Sulfonated resin type catalysts include the condensation products of phenol-formaldehyde with sulfuric acid. Also useful are the sulfonated resinous polymers of coumarone-indene with cyclopentadiene, sulfonated polymers of coumarone-indene with furfural, sulfonated polymers of coumarone-indene with cyclopentadiene and furfural, and sulfonated polymers of cyclopentadiene with furfural. Catalysts which may contain other functional groups such as —OH or —COOH, in addition to —$SO_3H$ can be obtained in the form of hard, resinous granules by heating a sulfuric acid-soluble polymer of an aliphatic olefin at temperatures between 250° F. and 350° F. in the presence of sulfuric acid for a period of time sufficient to convert the mixture into a water-insoluble, hydrogen ion exchange compound. This type of catalyst may be derived from spent sulfuric acid catalysts which have been used in the alkylation of isoparaffins with olefins (isobutane with butylenes), or in the polymerization of olefins and diolefins, which spent acid may contain from 5% to 20% of dissolved hydrocarbon polymers. The spent sulfuric acid containing the olefin polymers is heated between 250° F. and 350° F. for sufficient time to obtain solidification, but sulfonation may commence at a considerably lower temperature. The transformation from liquid to granular solid, which is accompanied by the evolution of SO₂, proceeds through the intermediate formation of a gel. In order to carry the reaction to completion, it is advisable to continue heating for an additional period subsequent to the granulation and hardening of the gel. The granular product is then washed with water to remove residual or excess acid, and is dried, the final material being hard, black, lustrous grains having hydrogen ion exchange properties. All of the catalysts mentioned above may lose their catalytic efficiency upon long continued use, but may be readily regenerated or reactivated by washing with dilute mineral acid, such as 2N hydrochloric acid, and thereafter water washed prior to reuse in the hydration reaction.

The present invention may be further illustrated by the following examples, which, however, are not to be construed as limiting the scope thereof.

A quantity of an organic hydrogen ion exchange catalyst constituting the sodium salt of a sulfonated coal, was admixed with 2N hydrochloric acid, and the mixture was thoroughly stirred for 2 hours, and then washed with water. This treatment was repeated three times, and the final product was washed free of sodium and chloride ions. The exchange capacity of the acid activated catalyst for calcium ions was found to be 1.47 milliequivalents of $Ca^+$ per gram of catalyst. The catalyst was then introduced into a tower provided with heating means, and thereafter a mixture of isobutylene and water was passed through the catalyst bed under various conditions of temperature, pressure, space velocity, etc. to obtain hydration of the isobutylene to tertiary butyl alcohol. The products of the hydration reaction were withdrawn from the catalyst tower and separated by fractionation. The results obtained are given in the following table, the yields of alcohol being based upon once-through operation. Considerably higher yields could, of course, be obtained by recycling the unconverted isobutylene and water.

| Run No. | 1 | 2 | 3 | 4 | 5 | 6 |
| --- | --- | --- | --- | --- | --- | --- |
| Weight catalyst, grams | 50 | 50 | 75 | 75 | 75 | 75 |
| Weight isobutylene, grams | 107.3 | 148.1 | 187.2 | 427.2 | 265.2 | 265.1 |
| Weight water, grams | 65.2 | 79.5 | 78.5 | 262.0 | 167.0 | 152.0 |
| Water/isobutylene ratio | 1.87 | 1.67 | 1.24 | 1.91 | 1.96 | 1.78 |
| Catalyst Temp., °F | 216 | 305 | 222 | 219 | 179 | 249 |
| Pressure, p. s. i. | 200 | 200 | 200 | 400 | 200 | 200 |
| Space velocity | 0.54 | 0.59 | 1.16 | 1.14 | 1.17 | 1.17 |
| Weight per cent isobutylene converted to alcohol | 52.6 | 9.7 | 58.1 | 60.7 | 16.4 | 13.1 |

While, in the above examples, isobutylene alone was employed as the iso-olefin charge stock, it is likewise possible to obtain substantial yields of tertiary alcohol using hydrocarbon mixtures containing one or more iso-olefins. For example, a mixture of isobutylene and normal butylenes, with or without the corresponding paraffins, may be employed, the normal butylenes and butanes remaining substantially unconverted into alcohols. It appears that only the iso-olefins are hydrated in accordance with the present invention, and it is therefore preferable to use iso-olefin charge stocks uncontaminated with normal olefins or paraffins in order to obtain the maximum conversion efficiency.

We claim:

1. The method of producing a tertiary alcohol, which comprises contacting an iso-olefin hydrocarbon and water with an organic hydrogen ion exchange hydration catalyst under hydrating conditions of temperature and pressure, and separating the tertiary alcohol from unconverted reactants.

2. The method of producing a tertiary alcohol, which comprises contacting an iso-olefin hydrocarbon of 4 to 12 carbon atoms and water with an organic hydrogen ion exchange hydration catalyst under hydrating conditions of temperature and pressure, and separating the tertiary alcohol from unconverted reactants.

3. The method of producing tertiary butyl alcohol, which comprises contacting isobutylene and water with an organic hydrogen ion exchange hydration catalyst under hydrating conditions of temperature and pressure, and separating the tertiary butyl alcohol from unconverted reactants.

4. The method of producing tertiary butyl alcohol, which comprises contacting isobutylene and water with an organic hydrogen ion exchange hydration catalyst at a temperature between 150° F. and 300° F. under a superatmospheric pressure sufficient to maintain the water in the liquid phase, and separating the tertiary butyl alcohol from unconverted reactants.

5. The method of producing tertiary butyl alcohol, which comprises contacting isobutylene and water with an organic hydrogen ion exchange hydration catalyst at a temperature between 190° F. and 250° F. under a pressure between 50 and 500 pounds per square inch, and separating the tertiary butyl alcohol from unconverted reactants.

6. The method of producing tertiary butyl alcohol, which comprises contacting isobutylene and water, in at least equi-molar quantities, with an organic hydrogen ion exchange hydration catalyst at a temperature between 210° F. and 225° F. under a pressure between 200 and 400 pounds per square inch, and separating the tertiary butyl alcohol from unconverted reactants.

7. The method of producing tertiary butyl alcohol, which comprises contacting isobutylene and water, in a mole ratio between 1 to 1 and 1 to 5, with an organic hydrogen ion exchange catalyst of the sulfonated resin type at a temperature between 210° F. and 225° F. under a superatmospheric pressure sufficient to maintain the water in the liquid phase, and separating the tertiary butyl alcohol from unconverted reactants.

8. The method of producing tertiary butyl alcohol, which comprises contacting isobutylene and water, in a mole ratio between 1 to 1 and 1 to 2, with a hydration catalyst comprising essentially a sulfonated coal having hydrogen ion exchange properties, at a temperature between 210° F. and 225° F. under a pressure between 200 and 400 pounds per square inch, and separating the tertiary butyl alcohol from unconverted reactants.

SAUL I. KREPS.
FREDERICK C. NACHOD.

(References on following page)

REFERENCES CITED

The following references are of record in the file of this patent:

UNITED STATES PATENTS

| Number | Name | Date |
|---|---|---|
| 2,036,317 | Bent et al. | Apr. 7, 1936 |
| 2,042,212 | Deanesly | May 26, 1936 |
| 2,070,258 | Coleman et al. | Feb. 9, 1937 |
| 2,143,478 | Engs et al. | Jan. 10, 1939 |

FOREIGN PATENTS

| Number | Country | Date |
|---|---|---|
| 509,710 | Great Britain | July 19, 1939 |

OTHER REFERENCES

Berkman et al., "Catalysis," page 731, Rheinhold Pub. Corp., N. Y. (1940).

Journal of Industrial and Engineering Chemistry, vol. 33, No. 6 (June 1941), pages 698 and 699, "Synthetic Resins as Exchange Adsorbents."